United States Patent
Ramesh et al.

(10) Patent No.: US 6,212,368 B1
(45) Date of Patent: Apr. 3, 2001

(54) MEASUREMENT TECHNIQUES FOR DIVERSITY AND INTER-FREQUENCY MOBILE ASSISTED HANDOFF (MAHO)

(75) Inventors: Rajaram Ramesh; Sandeep Chennakeshu; Gregory E. Bottomley, all of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/085,528

(22) Filed: May 27, 1998

(51) Int. Cl.[7] .......................... H04B 17/00; H04L 27/30
(52) U.S. Cl. ................... 455/277.2; 455/132; 455/269; 455/272; 455/277.1; 455/279.1; 455/437; 455/575
(58) Field of Search .................................. 455/437, 269, 455/270, 272, 277.1, 277.2, 279.1, 436, 19, 67.1, 575, 161.3, 226.1, 132, 135

(56) References Cited

U.S. PATENT DOCUMENTS

| | | | |
|---|---|---|---|
| 5,237,586 | * 8/1993 | Bottomley | 370/206 |
| 5,239,541 | * 8/1993 | Murai | 370/345 |
| 5,305,349 | * 4/1994 | Dent | 370/209 |
| 5,485,522 | * 1/1996 | Solve et al. | 381/56 |
| 5,490,165 | 2/1996 | Blakeney, II et al. | 375/205 |
| 5,530,926 | * 6/1996 | Rozanski | 455/277.2 |
| 5,570,349 | 10/1996 | Bustamante et al. | 370/18 |
| 5,572,552 | * 11/1996 | Dent et al. | 375/343 |
| 5,737,327 | * 4/1998 | Ling et al. | 370/335 |
| 5,828,659 | * 10/1998 | Teder et al. | 370/328 |
| 5,937,000 | * 8/1999 | Lee et al. | 375/200 |
| 6,018,667 | * 1/2000 | Ghosh et al. | 455/502 |

FOREIGN PATENT DOCUMENTS

| | | |
|---|---|---|
| 0 440 239 A3 | 8/1991 | (EP) . |
| 0 744 840 A2 | 11/1996 | (EP) . |
| 0 757 451 A2 | 2/1997 | (EP) . |
| 0 808 033 A2 | 11/1997 | (EP) . |
| 101983 | 3/1999 | (EP) . |
| WO 92/10886 | 6/1992 | (WO) . |
| WO 94/01974 | 1/1994 | (WO) . |
| WO 94/29981 | 12/1994 | (WO) . |

OTHER PUBLICATIONS

ISR for PCT/US 99/09830 completed on Jan. 10, 2000.
Standard Search Report for RS 101983 US completed on Mar. 25, 1999.

* cited by examiner

*Primary Examiner*—Fan Tsang
*Assistant Examiner*—Simon Nguyen
(74) *Attorney, Agent, or Firm*—Uenkens & Gilchrist, P.C.

(57) ABSTRACT

Diversity and inter-frequency mobile-assisted handoff (MAHO) are achieved under continuous reception cellular access methods by using strategic timing and switching optimizations. Strategic timing is achieved by avoiding the non-reception of power control bits. For example, the mobile terminal can make measurements for diversity in the last eight bits of a sub-frame of an IS-95 downlink transmission. Switching is optimized, for example, by storing rake taps for a first antenna prior to switching to a second antenna so that the rake tap positions can be restored upon returning to the first antenna. With these and other disclosed measurement techniques, the benefits of diversity and inter-frequency MAHO can be achieved in continuous reception cellular systems.

36 Claims, 5 Drawing Sheets

MEASUREMENT TECHNIQUES FOR DIVERSITY AND INTER-FREQUENCY MOBILE ASSISTED HANDOFF (MAHO)

BACKGROUND OF THE INVENTION

1. Technical Field of the Invention

The present invention relates to telecommunication systems and, in particular, to measurement techniques for achieving diversity and inter-frequency mobile assisted handoff (MAHO).

2. Description of Related Art

Mobile wireless communication is becoming increasingly important for safety, convenience, and efficiency. One prominent mobile communication option is cellular communication. Cellular phones, for instance, can be found in cars, briefcases, purses, and even pockets. Cellular phones, like most mobile communication options, rely on the transmission of electromagnetic radiation from one point to another.

In general, a cellular system is composed of many cells, each with a base station antenna for receiving transmissions. From the base station, the cellular system has interfaces for routing a call through or to the land-based, or terrestrial, telephone network, often referred to as the public switched telephone network (PSTN). The base stations form one half of the cellular system. Cell phones, called mobile stations, mobile terminals, or merely terminals, form the second half of the cellular system. In short then, electromagnetic radiation transmissions between terminals and base stations are an essential component of cellular systems, and such transmissions must be optimized by the cellular system to maximize cellular phone service, quality, and availability.

Properly operating cellular systems also requires significant planning, organization, and management. For instance, there must be a sufficient number of base stations to ensure a minimum level of service. Also, base stations must communicate with one another sufficiently to be able to coordinate a mobile terminal's transfer from one cell to another, termed handoff or handover. Furthermore, the portion of the electromagnetic spectrum that is allocated to a cellular system must be efficiently utilized.

Many different cellular phone system standards have been developed in response to these service, coordination, and efficiency requirements. Two examples of standards are the Global System for Mobile Communications (GSM) and the Advanced Mobile Phone Service (AMPS). Early standards were analog, but subsequent ones were digital. One standard, TIA/EIA/IS-95-A: Mobile Station-Base Station Compatibility Standard for Dual-Mode Wideband Spread Spectrum Cellular System (IS-95) that was promulgated in May of 1995 by the Telecommunications Industry Association, combines analog and digital concepts to enable cellular phone users to access both analog and digital systems. With IS-95, a dual-mode terminal will interface with a digital system when possible, but the terminal can also connect to an analog base station as well.

When communicating via the transmission of electromagnetic radiation, diversity can be used to counteract signal fading, which occurs when a signal's strength decreases. A given radio signal will usually take several diverse paths from the transmitter to the receiver. As a result, the receiver actually has several versions of the same signal from which to choose for processing. Often, the different paths will not be fading simultaneously, so if the receiver can always be processing the version of the signal with the least fade at a given moment, then the overall transmission will be more reliably received and processed. Diversity, then, is a term applied to various techniques for creating and/or selecting the current optimum version of the signal.

Some examples of diversity schemes are space, polarization, angle, frequency, time, and path diversity. Path diversity was explained above as occurring when an original signal follows multiple paths. These multiple paths arise from the signal taking a direct path or any one of many reflective paths. As a second example, polarization diversity is noted. In polarization diversity, the output from one of two antennas is selected by choosing the antenna that is properly polarized with the strongest signal. It offers benefits because signals transmitted on orthogonal polarizations exhibit uncorrelated fading. While only two diversity branches are available, polarization diversity can be especially important for hand-held mobile terminal communications because the hand-held devices are held at various angles during a phone call.

Another benefit of diversity results from the reduction in transmission power requirements. Transmission power requirements are reduced because selection by a receiver of the strongest signal from among diverse, uncorrelated signals enables a transmitter to reduce power. This power reduction improves interference tolerance, which results in an ability to support additional users within a given cell. In short, the entire range of diversity techniques provides increased interference immunity, which is especially important for interference-limited systems such as IS-95.

Another technique to improve cellular phone service and quality that some cellular system standards use is inter-frequency mobile assisted handoff (MAHO). Inter-frequency MAHO improves the process a mobile terminal undertakes when moving between microcells and macrocells. With inter-frequency MAHO, the mobile terminal provides assistance by making measurements on frequencies that differ from the frequency currently being used. Inter-frequency MAHO is especially important when dealing with hierarchical cell structures. In cellular systems with hierarchical cell structures, handoffs between microcells and macrocells can be more effectively performed by using the measurements provided by the mobile terminal. Consequently, the ability to make measurements on other frequencies is highly desirable when a mobile terminal is in motion.

Different multiple access methods are used by the different cellular system standards. Each method attempts, among other things, to efficiently utilize the limited resources of base stations and electromagnetic spectrum allocation. Other goals of access methods include maximizing capacity and service quality while minimizing implementation costs.

One access method is Frequency Division Multiple Access (FDMA). It divides the allocated spectrum into nonoverlapping segments and allots to the terminal of each cellular user a frequency segment on which to transmit.

Another access method is Time Division Multiple Access (TDMA). It permits each terminal to use a given frequency for a limited time. Then a different terminal is permitted to use the same frequency. Shortly, the original terminal is again permitted a slice of time in which to use the frequency. In this technique, several cellular users share the same frequency or frequency segment over time in a nonoverlapping, round-robin fashion.

Yet another access method is Code Division Multiple Access (CDMA). In this spread-spectrum technique, each terminal is permitted to use the entire spectrum allocated for a channel in a given cell at all times. The base station differentiates one terminal's signal from that of another by detecting a digital code embedded in the transmission of each terminal's signal. This code arises because the transmitted signals have very small cross-correlation. Therefore, correlators can be used to extract individual signals from a mixture of signals even though they are transmitted simultaneously and in the same frequency band. IS-95's digital mode, for example, utilizes CDMA.

As explained above, diversity is important to efficient cellular communication, regardless of the cellular system standard or access method employed. To achieve diversity, the diverse signals must be combined in some preferably optimum way. In short, the best signal or the best combination of signals should be extracted. One such combination technique is selection combining, or specifically pre-detection selection diversity (or merely pre-selection diversity). In selection diversity, the receiver attempts to choose the diversity branch with the highest carrier to noise ratio (C/N). More specifically, in pre-detection selection diversity, the selection of the antenna is made before reception of the desired signal.

Pre-detection selection combining has typically been proposed for TDMA systems, in which a mobile terminal does not need to receive continuously. Hence, the TDMA mobile terminal can simply sample the signal on both antennas during non-allotted time frames. Then it can make an appropriate selection before its allotted receive time frame occurs. In TDMA systems, pre-detection selection combining enables the use of only one receive chain when implementing selection combining.

In contradistinction to TDMA systems, CDMA systems in general and IS-95 systems in particular normally require a mobile terminal to receive signals from a base station continuously. Hence, the CDMA mobile terminal (with only one receive chain) cannot simply sample the signal on the second antenna during non-allotted time frames because IS-95 does not specify any non-allotted time frames. Similarly, because the signal is being received continuously, the CDMA mobile terminal cannot switch to another frequency for the purpose of making measurements for inter-frequency MAHO. Thus, heretofore, continuous reception cellular system standards hindered the implementation of selection diversity and inter-frequency MAHO and thus the enjoyment of the accompanying benefits.

Therefore, one object of the present invention is to enable diversity and inter-frequency MAHO in continuous reception systems, such as IS-95.

Another object of the present invention is to provide measurement techniques for achieving diversity and inter-frequency MAHO in continuous reception systems, such as IS-95.

Another object of the present invention is to provide a method to perform pre-detection selection diversity combining in continuous reception systems, such as IS-95.

Yet another object of the present invention is to provide a simple method for implementing a diversity receiver for the downlink of a continuous reception system, such as IS-95.

Yet another object of the present invention is to provide a method for selecting between two antennas for phones in continuous reception systems, such as IS-95, based on signal strength measurements.

Yet another object of the present invention is to implement the above methods and apparatuses while minimizing bit error rates.

SUMMARY OF THE INVENTION

The foregoing and other objects of the present invention are achieved by a method and apparatus that make measurements for pre-detection selection diversity and inter-frequency MAHO purposes. In a preferred embodiment, only a single receiver chain is necessary, thereby the cost of the mobile terminal is reduced. The use of a second receiver chain is obviated by ceasing reception of transmitted bits on a first antenna, for diversity purposes, or on a first frequency, for inter-frequency MAHO purposes; by then switching to a second antenna or frequency; and by finally making appropriate measurements on the second antenna or frequency.

According to one aspect of the present invention, strategic timing is used to minimize the impact of measurements on the proper operation of the communications system. For IS-95 systems, for example, proper operation of the system depends on reception of power control bits. This is ensured, in one instance, by selecting the last eight bits of a sub-frame as the measurement period. In another instance, measuring is timed to coincide with the transmission of invalid power control bits.

In another aspect of the present invention, the bit error rate (BER) in digital systems is reduced. The receiver immediately begins estimating rake taps and positions upon switching to a second antenna, in a first instance, so that the receiver can converge on a reasonable set of rake taps if it is determined that the second antenna is superior. In another instance, processed bits from the second antenna are used to replace bits erased from the first antenna. In this context, erasing can imply, for example, replacing bit values with zero values. Furthermore, the erased bits may be substituted with other bits as will be explained in greater detail below.

In other aspects of the present invention, timing frequency and selection criteria are optimized. Furthermore, the present invention creates longer measurement intervals by intelligently taking advantage of lower transmission rates due to voice activity.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

A preferred embodiment of the present invention and its advantages are best understood by referring to FIGS. 1–9 of the drawings, like numerals being used for like and corresponding parts of the various drawings.

Figure 1:
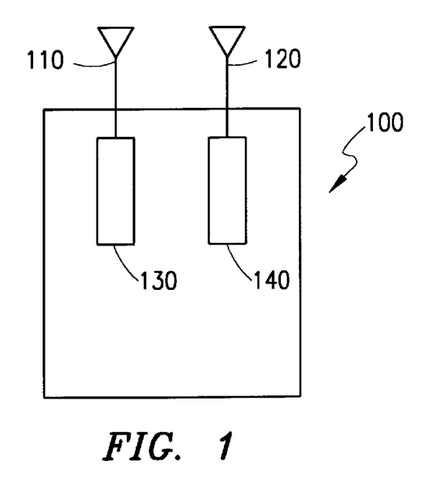
FIG. 1 is an illustration of a receiver with two antennas and one receiver chain per antenna.

A mobile terminal may make measurements in an IS-95 (or other continuous reception) system is as follows. The mobile terminal can employ two antennas and two receiver chains, and it can perform rake (maximum ratio) combining of the taps from the two different antennas. Referring to FIG. 1, receiver 100 includes a first antenna 110 and a second antenna 120. Each antenna is connected to its own receiver chain. First antenna 110 is connected to first receiver chain 130, and second antenna 120 is connected to second receiver chain 140. This measurement technique can be used in, among other circumstances, diversity combining and frequency switching for inter-frequency MAHO.

Both first receiver chain 130 and second receiver chain 140 may include the following components electrically interconnected after their respective antennas. After an antenna receives a signal, it is then passed consecutively through a filter, a (low-noise) amplifier, a mixer, another filter, another mixer, and then to digital electronics for further processing. Each received signal path may be combined with a maximal ratio technique. The paths from both antennas are first cophased and then weighted proportional to their signal level before summing.

The two-receiver-chain implementation of a mobile terminal can be utilized to make measurements for diversity and inter-frequency MAHO in continuous reception systems by avoiding the cessation of reception. Because an entirely separate receiver chain is provided for both antennas, signal strength on the second antenna can be determined without ceasing reception. While this two-receiver-chain option can be used to make measurements for diversity and inter-frequency MAHO, the inclusion of a second receiver chain adds significantly to the expense of a mobile terminal.

Figure 2:
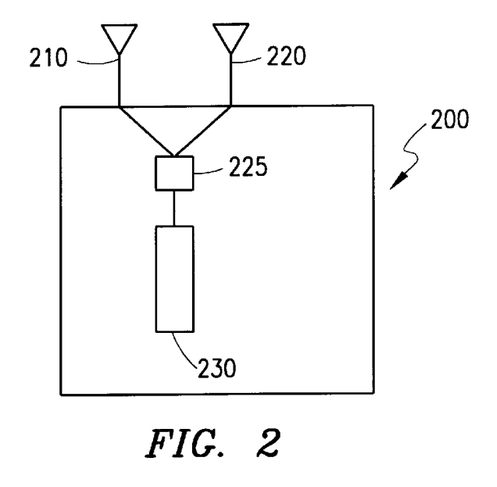
FIG. 2 is an illustration of a receiver with two antennas and a sole receiver chain.

In a preferred embodiment of the present invention, the need for two receiver chains is eliminated, and thus the cost, size, and complexity of the mobile terminal is significantly reduced. Referring to FIG. 2 for a preferred embodiment, receiver 200 includes first antenna 210 and second antenna 220, either of which is connected to sole receiver chain 230 via switch 225.

A preferred embodiment of the present invention implements strategic timing and planning procedures to eliminate the need for a second receiver chain. The mobile terminal ceases receiving the signal on the present antenna or frequency, samples the signal on the other antenna or frequency, and then determines whether to return to the first antenna or frequency or whether to remain with the second antenna or frequency. This determination is made based on the measured signal strength of the second antenna or, alternatively, based on an estimate obtained of the signal strength on the second antenna.

By ceasing reception in a digital, continuous-reception cellular system (as in, for instance, IS-95), some of the transmitted bits will not be received. However, the present invention minimizes the number of bits lost. First, rate ½ coding with interleaving over the frame is employed in IS-95; thus, losing some of the bits can result in only a small degradation in the error rate. The effect of lost bits will be even less substantial when the base station is transmitting at lower speech coder rates (with more coding) The loss in performance due to a higher bit error rate (BER) will be negligible compared to the performance boost from the diversity gain.

Furthermore, when the switching is sufficiently fast, the switching and measuring operation will cause the loss of only a few chips, as opposed to bits, and demodulation will not be severely affected. (Many chips are transmitted to send one bit. Each chip preferably corresponds to an individual term of a random sequence. The clock period of the pseudo random sequence generator used in spread spectrum CDMA digital communication systems is the chip duration.)

Figure 3:
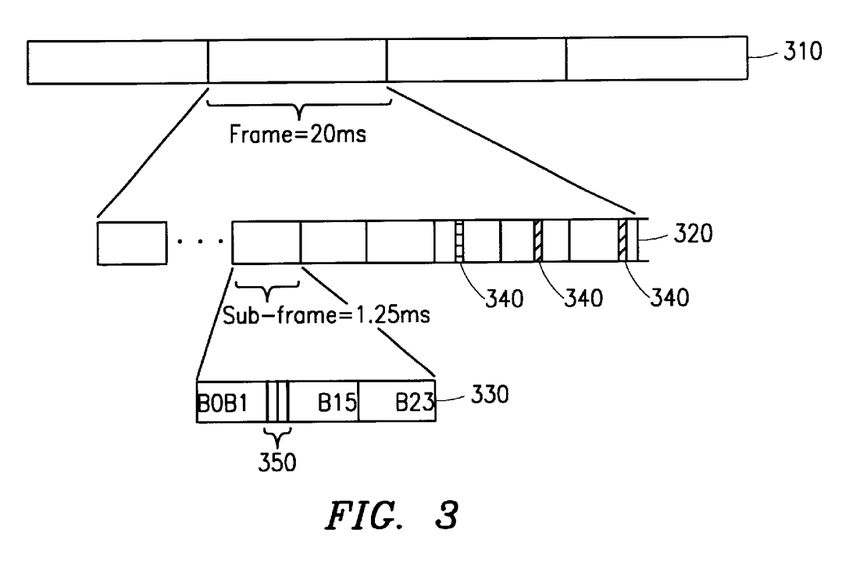
FIG. 3 is an illustration of a possible IS-95 signal structure.

Referring to FIG. 3, one possible structure for an IS-95 downlink signal is illustrated. While the principles of the present invention are described primarily in terms of the IS-95 standard, it should be noted that the invention is not to be so limited. On the contrary, the method and apparatus of the present invention is equally advantageous in other wireless communication systems and standards, especially those based on continuous-reception paradigms. In FIG. 3, four frames, which are also called slots, are diagramed at 310. In this example, each frame 320 is 20 milliseconds (ms) in duration. Each 20 ms frame 320 contains a self-contained slot of data that has been interleaved within the 20 ms interval. Sixteen sub-frames 330, or sub-slots, are diagramed at 320. Each sub-frame 330 lasts 1.25 ms, and sixteen sub-frames 330 are in each frame 320. Also at element 320, the existence of some of the power control bits positions 340 are illustrated as well.

Continuing with the example in FIG. 3, each sub-frame 330 is shown to be composed of 24 bits. Within the first 16 bits two power control bits 350 will occur in consecutive positions. The starting position of the two power control bits is chosen pseudo-randomly using a long code. The mobile terminal knows the positions of the power control bits. The information transmitted from the base station is scrambled by a long pseudo-random sequence, which also determines the position of the power control bits. The mobile terminal knows the pseudo-random sequence and is able to calculate it well in advance of a current frame.

The power control bits are instructions from the base station to an individual mobile terminal. The base station instructs the terminal to transmit at a certain power level. This is especially important in spread spectrum systems like IS-95 in which the power levels of transmissions from all terminals are preferably approximately equal when they reach the base station. Achieving approximately equal power levels prevents proximal terminals from jamming distant terminals and thereby facilitates proper despreading of the spread spectrum signals.

Figure 4:
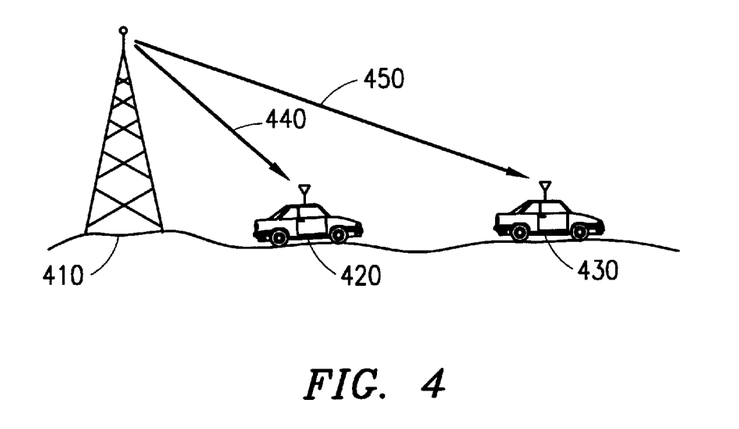
FIG. 4 is an illustration of the minimization of the near-far problem through power control.

For an example, please refer now to FIG. 4, which is an illustration of the minimization of the near-far problem through power control. Base station 410 is in communication with mobile stations 420 and 430. If mobile station 420 and mobile station 430 transmit at the same power level, then usually (depending on the terrain, etc.) the signal level from mobile station 420 will be stronger than that from mobile station 430. When this occurs, the signal from mobile station 430 can become overpowered by the signal from mobile station 420 and therefore unreceivable. To remedy this, base station 410 sends command 440 to mobile station 420 instructing it to reduce its power or command 450 to mobile station 430 instructing it to increase its power (or some combination thereof). The signal strengths received from each mobile station 420 and 430 by base station 410 will then be tuned to be approximately equal.

CDMA systems rely on universal frequency reuse for an efficient utilization of the assigned spectrum. Superlative power control furthers the viability of universal frequency reuse by ensuring that each mobile terminal receives and transmits at just sufficient energy to properly communicate the data while minimizing the interference caused to other mobile terminals, which are using the same universal frequency. It should be noted that another benefit to power control is the maximization of battery life.

Figure 5A:
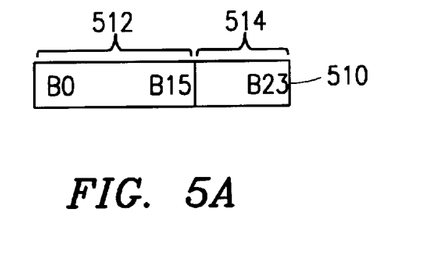
FIG. 5A is an illustration of measurement according to one timing aspect of the present invention.

In other words, reception of the power control bits is important to the proper operation of the system. Hence, it might not be optimal to cease reception of the power control bits. Therefore, in a preferred embodiment of the system of the present invention, there is a first timing aspect. The terminal strategically chooses to measure the signal strength on the second antenna only during the last eight bits of the last sub-slot before the desired frame. Referring now to FIG. 5A, subframe 510 illustrates the first 16 bits in period 512 and the last 8 bits in period 514. In this embodiment, then, measurement will be timed to occur during period 514 when subframe 510 precedes the desired frame.

Figure 5B:
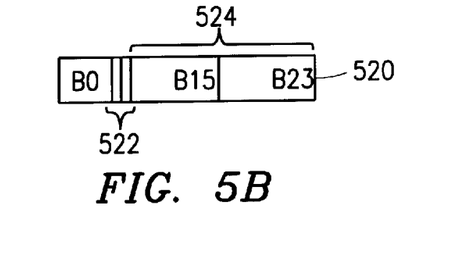
FIG. 5B is an illustration of measurement according to another timing aspect of the present invention.

In another timing aspect embodiment according to the present invention, the terminal can make a different strategic choice and extend the measurement period beyond eight bits when necessary or desired, without losing any power control bits. The mobile terminal can wait until the power control bits occur in an earlier portion of a sub-slot and then use the remaining portion, which will be a significant portion, of the sub-slot for measurement of signal strength on the second antenna. Referring now to FIG. 5B, subframe 520 is illustrated with early-occurring power control bits 522. According to this embodiment, measurement will occur during period 524, which is a significant portion of the subframe.

Figure 5C:
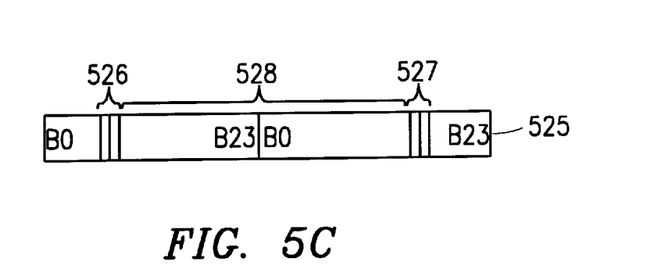
FIG. 5C is an illustration of measurement according to yet another timing aspect of the present invention.

In yet another timing aspect embodiment of the present invention, the terminal can make yet a different strategic choice to extend the measurement period. The mobile terminal may wait until the power control bits occur in an early portion of a first sub-slot and occur in a latter portion of the next sub-slot. The portion between the two sets of power control bits may be used for measurement. Referring now to FIG. 5C, two subframes 525 are illustrated with early-occurring power control bits 526 and later-occurring power control bits 527. Measurements may therefore be made during period 528 according to this embodiment of the present invention.

In yet another timing aspect embodiment of the present invention, the terminal can make yet a different strategic choice and extend the measurement period to an entire sub-frame or even over multiple sub-frames. The power control bits sent to the mobile terminal from the base station are in response to prior transmission(s) from the mobile to the base. The base station responds to the present power level it is receiving by transmitting appropriate power control bits in response. However, according to the present invention, some of these power control bits can be ignored and measurements can be taken while the power control bits are not being received.

Figure 5D:
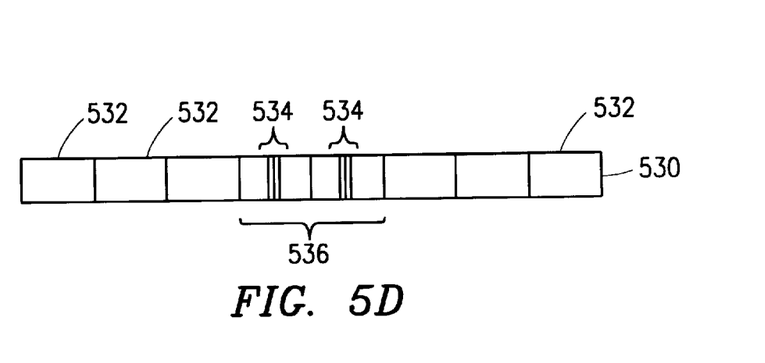
FIG. 5D is an illustration of measurement according to yet another timing aspect of the present invention.

The mobile terminal can determine when the power measurements taken by the base station were over sub-frames in which the mobile terminal did not transmit any information. (Discontinuous Transmission (DTX) is implemented in IS-95, for example, by blanking the transmission of sub-frames on the uplink.) According to the present invention, the mobile terminal can then schedule its measurements on the second antenna during sub-frames with power control bits that correspond to non-transmitting time periods. By disregarding the power control bits in such sub-frames and extending the measurement period, the mobile terminal can obtain better measurements of the signal strength on the second antenna. Referring now to FIG. 5D, half-frame 530 is illustrated with eight subframes 532, only three of which are specifically labeled in the illustration. After the mobile terminal has determined that both pairs of power control bits 534 will be invalid, then the mobile terminal can make measurements during period 536 according to this embodiment of the present invention.

CDMA systems, like IS-95, rely on direct sequence spread spectrum signals, and one of the advantages of direct sequence spread spectrum signals is the ability to implement rake receivers. Rake receivers process signal energy from each resolved signal path and then combine them with appropriate weighting and timing. The mobile (and base) station can employ three (and four), for example, parallel correlators for demodulating the pseudo-noise waveform. The parallel correlators enable individual paths to be tracked independently, and then the sum of their received signal strengths is used to demodulate the signal. This demodulation is far more reliable than one performed by a non-rake receiver. It should be noted that the plurality of correlators also enable the simultaneous tracking of signals from two different cells, as is important for soft handoff. Also, the parallel demodulators are sometimes called rake fingers and correspond to rake taps.

Figure 6:
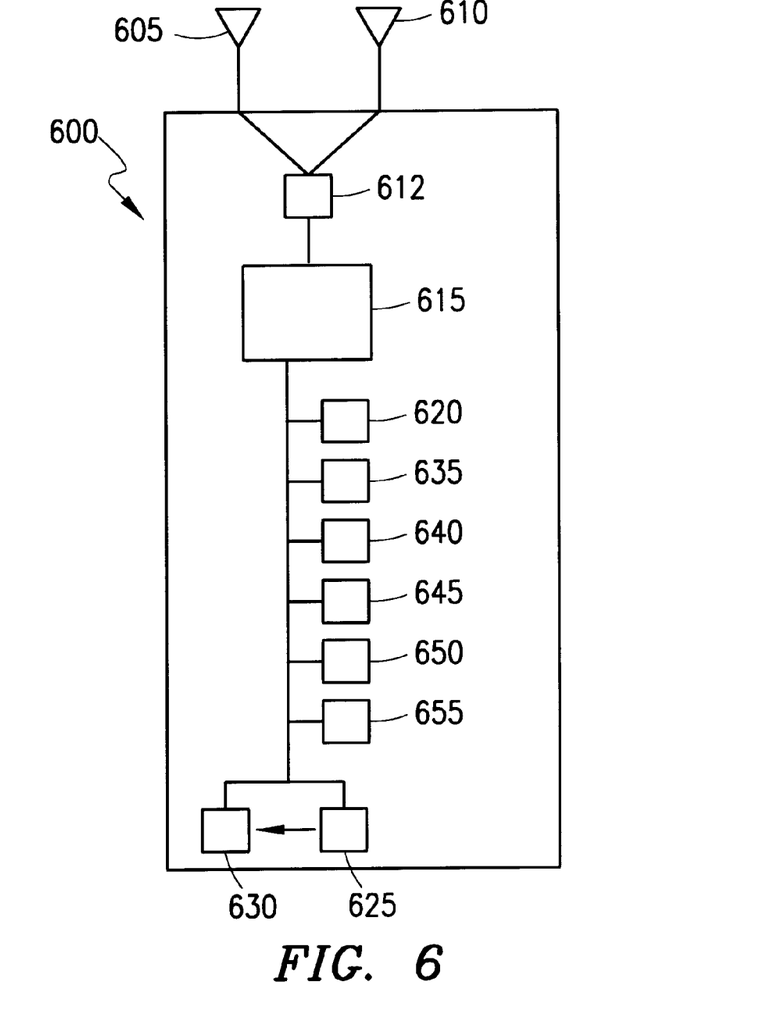
FIG. 6 is another illustration of a receiver with two antennas and a sole receiver chain according to further aspects of the present invention.

Referring now to FIG. 6, a logical diagram of a receiver with two antennas and a sole receiver chain is pictured. Receiver 600 includes a first antenna 605 and a second antenna 610. First antenna 605 and second antenna 610 are both connected to switch 612, whose output is connected to receiver chain and rake receiver 615.

The channel values on the different rake taps are estimated continuously when receiving a signal. In an optimum switching aspect of the present invention, the BER is minimized by minimizing the time required to return to receiving on the first antenna. This is accomplished as follows. Before switching to the second antenna to make received signal strength indicator (RSSI) measurements, the values of the channel taps and positions on the signal received from the first antenna are stored in channel taps and positions buffer 620. Upon switching back to the first antenna, the values from channel taps and positions buffer 620 are reloaded and signal reception commences from that point. This saves time by eliminating the need to start from scratch when searching for optimum channel taps and positions.

Figure 7:
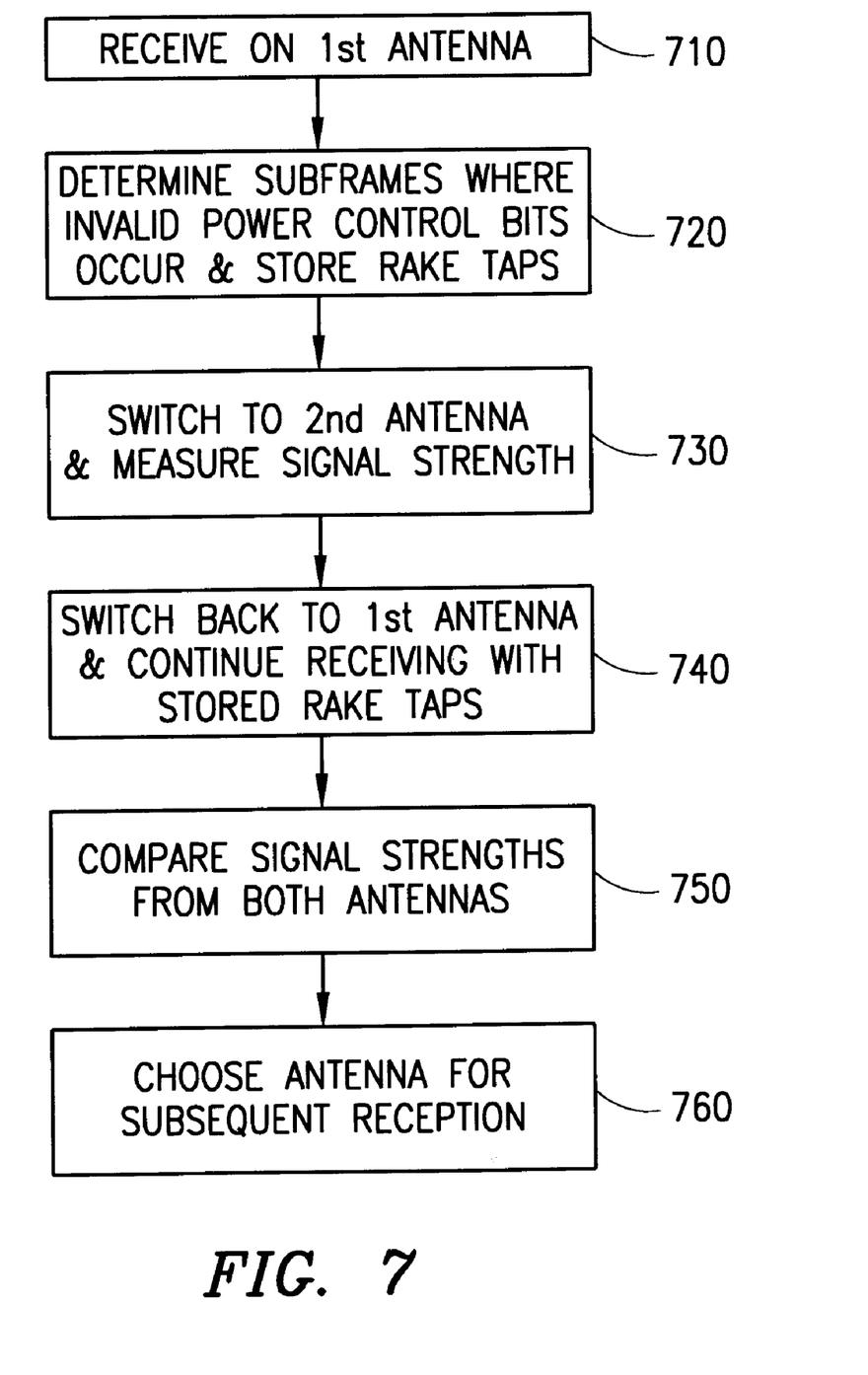
FIG. 7 is a flowchart of a method in accordance with the present invention.

Referring to FIG. 7, a preferred method for selecting the better of two antennas of a mobile terminal is illustrated. At Step 710, the signal from the base station is being received on the first antenna. At Step 720, the mobile terminal determines which subframes include invalid power control bits. Before switching to the second antenna, the mobile terminal also stores the rake taps for the first antenna. Next, in Step 730, the mobile terminal switches to the second antenna at the subframes with the invalid power control bits. The signal strength on the second antenna is also measured at Step 730. At Step 740, the mobile terminal switches back to the first antenna and restores the previously saved rake taps. Reception is then continued with the first antenna. In Step 750 the signal strengths from the respective first and second antennas are compared. The antenna with the better signal strength is then selected for subsequent reception in Step 760.

Another preferred method modifies FIG. 7 as follows. Steps 710 and 720 can remain unchanged. However, the signal strength on the first antenna is definitely measured before switching to the second antenna in Step 730. After the signal strength is measured in Step 730, the signal strength comparison Step 750 occurs without the switching back to the first antenna of Step 740. Advantageously, if the selection Step 760 determines that the second antenna is superior, then no extraneous switching will have occurred. The mobile terminal can continue subsequent reception on the second antenna. It should be understood that the terms "first" and "second", as applied to the antennas, can be aptly substituted with "selected" and "non-selected" because which physical antenna is the "first" or "second" antenna changes with time.

In response to the possibility that the mobile terminal will continue subsequent reception on the second antenna, a second optimum switching technique can be utilized. In this BER-minimizing aspect of the present invention, the receiver can immediately start estimating rake taps and positions for the second antenna after switching to the second antenna. Consequently, if it is determined that the RSSI is more advantageous on the second antenna, then the receiver is more likely to be able to converge to a reasonable set of rake taps by the time the frame starts.

In yet another optimum switching and BER-minimizing aspect of the present invention, processed bits received while on the second antenna can be used instead of being discarded. These processed bits from the second antenna are stored in second antenna processed bits buffer 625 and can be used to fill in erased bits from the signal on the first antenna. This is accomplished by transferring the processed bits in second antenna processed bits buffer 625 in the direction of the arrow to first antenna processed bits buffer 630. Alternatively, all bits may be stored in a single buffer, thus obviating a requirement for two separate buffers 625 and 630. In fact, all information/data may be stored in a single general-purpose memory (not shown) of receiver 600. At times, the performance achieved using this substitution of second antenna processed bits for first antenna erased bits will be superior to merely erasing all the bits not received using the first antenna.

A further optimum switching aspect of the present invention that can reduce the BER entails storing some history of the searcher from the first antenna in rake tap search history buffer 635. Though it is highly likely that the echoes on the two antennas are at the same times, the subset of these that are used may differ between the two antennas. By storing a list of the few maximum ones on each antenna (a longer list than the rake taps used) in rake tap search history buffer 635, the list can be used as a set of preferred positions to search for rake taps after switching to the second antenna.

It should be noted that although the various buffers and modules in receiver 600 are shown together, they do not necessarily need to be used together or need to be present together in receiver 600. In other words, the different techniques and associated buffers/modules can be used separately as will be apparent to one of ordinary skill after understanding the teachings of the present invention.

Another aspect of the measurement technique of the present invention entails setting the timing frequency of the measurement operation. The measurement operation to determine which one of the two antennas or antenna combinations is currently superior can be performed on several different schedules. First, it can be performed each frame. Alternatively, the measurements can be done with a minimum time duration between measurements. Requiring a minimum time can beneficially help to alleviate the loss in performance due to the loss of bits. This is a preferable option because most gain due to this form of selection diversity would likely occur at low mobile terminal speeds; therefore, allowing time between measurements will not severely degrade performance during those times. Timing frequency module 640 performs the determination of the measurement timing frequency. It should be noted that module here, as throughout the current disclosure, is intended to connote hardware, software, firmware, or any other equivalent technique or structure to accomplish the timing frequency determination.

Another aspect of the measurement technique for achieving diversity and inter-frequency MAHO of the present invention entails choosing antenna selection criteria. Determining which antenna or antenna combination should be selected can be based on a myriad of criteria. First, when the two antennas have different gains, the selection can be based on a comparison of the signal strengths with compensation for the gain imbalance between the antennas. This technique is fully described in a related application assigned U.S. Ser. No. 09/017,829, by Rajaram Ramesh and Sandeep Chennakeshu and entitled "Apparatus and Method of Selecting Between a Plurality of Antennas Utilized by a Microcellular Communications Terminal for Reception of a Signal," which application is hereby incorporated by reference in its entirety herein.

An alternative technique described in this related application is frame error triggered diversity. In this alternative selection criterion, when an antenna receives a frame that is perceived to be in error, then the mobile terminal switches to the other antenna. Another possible metric for switching between the two antennas entails measuring the cumulative strengths of the rake taps. The cumulative strengths of the rake taps are then used in lieu of the total signal strength. Antenna selection criteria module 645 performs the analysis and the implementation of the antenna selection criteria.

Another principal purpose for the measurement technique of the present invention is to achieve inter-frequency mobile assisted handoff (MAHO) for single-antenna or multi-antenna terminals. The timing aspects and switching optimizations described above primarily in the context of pre-detection selection diversity are applicable here as well. One difference when performing measurements for inter-frequency MAHO, however, is the considerably longer switching times that may be required. The switching times may be longer because of the need to switch to a different frequency to perform the measurement. The duration needed to perform a valid measurement could extend to a time period on the order of a few milliseconds. Without the benefits of the present invention, failing to receive the traffic channel for such a time period will prevent proper reception of power control bits.

Nevertheless, strategic timing can be implemented so that necessary power control bits (or at least most of the power control bits) will still be received. For instance, when the mobile terminal is transmitting at a low rate due to voice activity, the power control bits received in many subframes are invalid. With careful timing, the mobile terminal can switch to another frequency in the duration of a few such subframes and make measurements. This will likely lead to some, but still an acceptable level of, degradation in the frame error rate. Please refer again to FIG. 5C for a diagrammatic representation of this strategic timing technique.

Second, this operation can be commanded by the base station. After receiving the command, the mobile station can lower its transmission rate irrespective of speech activity and make the measurement. Transmission-rate-lowering command-receiver module 650 performs this function in receiver 600. Alternatively, it is possible that under some conditions multiple consecutive subframes with invalid power control bits will occur even when the transmission rate is moderate. Hence, further intelligent strategic scheduling of the measurement can have less of an effect on speech quality by switching to a medium rate instead of a low rate. Intelligent strategic scheduling module 655 performs this function in receiver 600.

Figure 8:
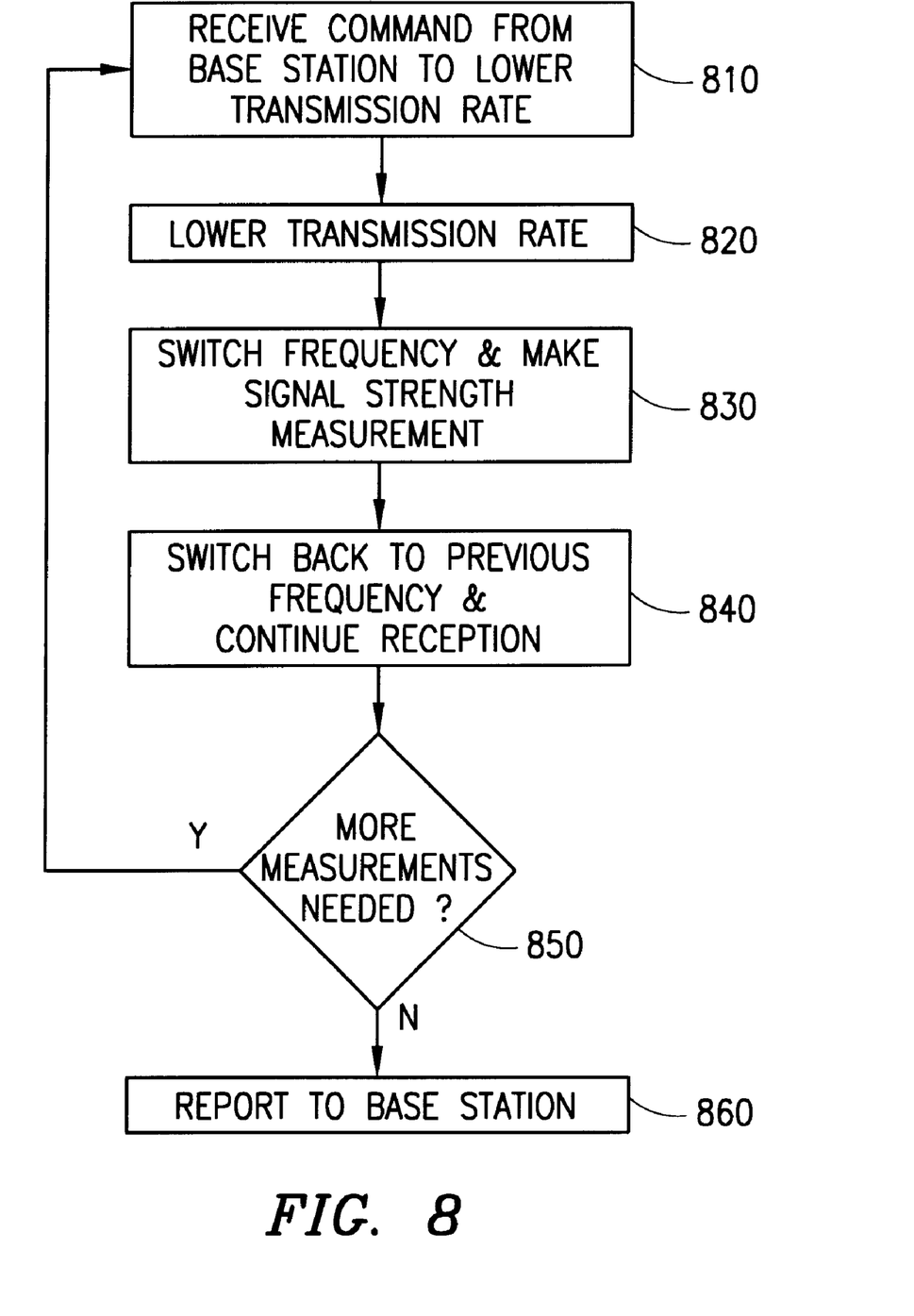
FIG. 8 is a flowchart of another method in accordance with the present invention.

Referring to FIG. 8, a preferred method for switching frequencies to enable inter--frequency MAHO is illustrated. In Step 810, the mobile terminal receives a command from a base station instructing it to lower the transmission rate. The mobile terminal lowers the transmission rate in Step 820. Next in Step 830, the mobile terminal switches frequencies and makes one or more signal strength measurements. In Step 840, the mobile terminal switches back to the previous frequency and continues reception.

Step 850 involves ascertaining whether additional measurements are needed to determine which frequency provides a superior wireless link. If more measurements are needed, then the mobile terminal returns to Step 810 to await the reception of another command from the base station. If further measuring is not required, then the mobile terminal communicates a report to the base station in Step 860. After the reporting of the measurements to the base station in Step 860, the base station/cellular system may decide to handoff the mobile terminal to the new frequency if, for example, the new frequency provides a superior wireless link. In addition, the base station can provide the mobile terminal with information as to the likely phases of the spreading code for the base stations to be measured. Using these spreading codes, the mobile terminal can attempt to synchronize to a particular spreading code and verify the identity of the base station from which it made a signal strength measurement.

Returning to the pre-detection antenna selection diversity purpose (as contrasted with the inter-frequency MAHO purpose) behind ceasing reception of some bits, another embodiment is described below. One desirable goal is to minimize not only the number of bits potentially lost, but the number of chips as well. Logically, if the number of lost chips can be sufficiently minimized, then no bits will be lost. Unfortunately, switching antennas can lose many chips in some instances. This will happen when switching shock excites the intermediate frequency (IF) filter with a huge pulse. Therefore, to increase the effective switching speed, a smooth transition can be achieved instead of an abrupt switch by using a phase shifter.

Figure 9:
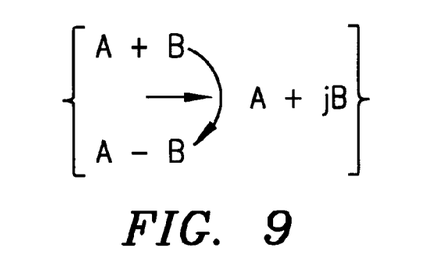
FIG. 9 is an illustration of a practical implementation of the present invention.

Referring to FIG. 9, a diagrammatical view of a phase shifter is illustrated. The smooth transition can be accomplished by rotating the phase shifter 180 degrees from (A+B) to (A−B) through (A+jB). Furthermore, the mobile terminal can cause the phase shifter to return to the position most favorable to the receiver.

For inter-frequency MAHO, the receive chain frequency synthesizer tunes to the other carrier. If MAHO occurs during transmission from the terminal to the base station, then overall frequency synthesis usually requires the same transmit frequency with different receive frequencies. It is common to design terminals with paired transmit and receive frequencies. For this case, it is preferable to perform MAHO measurements when transmission is discontinued.

It should be understood that the principles of the present invention are not limited only to ensuring reception of power control bits. For example, the timing, switching, and BER-minimizing aspects of the present invention may be applied generally to other signal portions whose receptions may be relatively prioritized. With respect to the power control bit examples, the reception of power control bits is prioritized higher than the reception of other transmitted bits. In effect, two classes of bits are delineated by this prioritization process. The first class of bits (e.g., power control bits) is prioritized higher than the second class of bits (e.g., coded speech bits).

This prioritizing classification may extend to other types of bits such as control bits (e.g., packet acknowledgment) or speech bits that have a greater impact on speech quality. A principle of the present invention is to try to avoid missing the reception of the highest priority of bits (e.g., the first class of bits). Minimizing loss of bits from the highest priority of bits may be accomplished by using one or a combination of the techniques described hereinabove. For instance, measurement may begin soon or immediately after the arrival of a first set of the first class of bits, and/or measurement may cease soon or immediately before the arrival of a second set of the first class of bits. The measurement may also extend across a subframe boundary, e.g., into two subframes. Three or more classes of bits may also be prioritized in which, e.g., reception of the third class of bits are generally sacrificed first.

Although preferred embodiments of the method and apparatus of the present invention have been illustrated in the accompanying Drawings and described in the foregoing Detailed Description, it will be understood that the present invention is not limited to the embodiment disclosed, but is capable of numerous rearrangements, modifications and substitutions without departing from the spirit of the present invention as set forth and defined by the following claims.

What is claimed is:

1. A method for establishing a preferred reception state in a continuous reception receiver, the method comprising the steps of:

receiving a signal on a first antenna according to a first reception state, said signal including at least one power control bit;

processing said signal with a receiver chain;

switching receiving from said first reception state to a second reception state;

making at least one measurement while receiving according to said second reception state;

determining whether said first reception state is superior to said second reception state;

establishing receiving according to a superior reception state based on said step of determining; and further comprising the step of:

scheduling said step of making at least one measurement based, at least in part, on knowledge of a bit location of said at least one power control bit.

2. The method of claim 1, wherein:

said second reception state includes receiving said signal on a second antenna;

said step of switching further comprises the step of switching from said first antenna to said second antenna;

said step of making at least one measurement further comprises the step of measuring a second received signal strength on said second antenna; and said step of determining further comprises the step of comparing said second received signal strength on said second antenna to a first received signal strength on said first antenna.

3. The method of claim 2, further comprising the steps of:

storing a list of rake tap positions used by said first antenna; and using said list of rake tap positions as a preferred list of rake tap positions when searching for new rake taps after switching to said second antenna.

4. The method of claim 3, wherein said step of storing a list of rake tap positions used by said first antenna further comprises the step of:
storing said list of rake tap positions used by said first antenna such that said list of rake tap positions exceeds the actual set of rake tap positions used by said first antenna.

5. The method of claim 2, further comprising the step of processing said signal with said receiver chain directly after switching to said second antenna, said signal being received on said second antenna after switching to said second antenna.

6. The method of claim 2, wherein said step of establishing receiving according to a superior reception state based on said step of determining further comprises the steps of:
selecting said first reception state if said first received signal strength exceeds said second received signal strength; and
selecting said second reception state if said second received signal strength exceeds said first received signal strength.

7. The method of claim 6, wherein said step of determining further includes the step of comparing a gain imbalance between said first antenna of said first reception state and said second antenna of said second reception state.

8. The method of claim 6, wherein said step of determining further includes the step of comparing cumulative strengths of rake taps across said first antenna of said first reception state and said second antenna of said second reception state.

9. The method of claim 1, wherein said steps of switching and making at least one measurement occur during a receive frame intended for the continuous reception receiver, whereby some portion of said signal directed to said continuous reception receiver is not processed in said step of processing.

10. The method of claim 1, wherein said step of scheduling schedules the occurrence of said step of making at least one measurement during a subframe when power control bits are transmitted in an early portion of said subframe.

11. The method of claim 1, wherein said step of scheduling schedules the occurrence of said step of making at least one measurement during a first subframe and a second subframe when power control bits are transmitted in an early portion of said first subframe and power control bits are transmitted in a later portion of said second subframe.

12. The method of claim 1, wherein said step of scheduling schedules the occurrence of said step of making at least one measurement during a subframe with invalid power control bits.

13. The method of claim 1, wherein said step of making at least one measurement is scheduled at a predetermined frequency or with a predetermined time interval between successive measurements.

14. The method of claim 1, wherein:
said first reception state further includes receiving on a first frequency;
said second reception state includes receiving on said first antenna on a second frequency;
said step of switching further comprises the step of switching from said first frequency to said second frequency;
said step of making at least one measurement further comprises the step of measuring a second received signal strength on said second frequency; and
said step of determining further comprises the step of comparing said second received signal strength on said second frequency to a first received signal strength on said first frequency.

15. The method of claim 14, further comprising the steps of:
receiving information regarding at least one phase of at least one spreading code of at least one base station to be measured;
attempting to synchronize to said at least one spreading code; and
verifying an identity of said at least one base station to be measured.

16. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
wherein:
said second reception state includes receiving said signal on a second antenna;
said step of switching further comprises the step of switching from said first antenna to said second antenna;
said step of making at least one measurement further comprises the step of measuring a second received signal strength on said second antenna;
said step of determining further comprises the step of comparing said second received signal strength on said second antenna to a first received signal strength on said first antenna; and
further comprising the steps of:
storing rake tap positions and values from said first antenna prior to switching to said second antenna; and
reloading said rake tap positions and values if said first reception state is established by said step of establishing.

17. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
wherein said step of making at least one measurement occurs during the last eight bits of a subframe, said subframe comporting with the IS-95 wireless communications standard.

18. The method of claim 17, wherein said subframe is immediately prior to a desired frame.

19. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
further comprising the step of erasing bits from a processed version of said signal, the erased bits being those that are not received while switching from said first reception state to said second reception state.

20. The method of claim 19, further comprising the step of substituting bits received when receiving according to said second reception state for the erased bits from said processed version of said signal.

21. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
wherein:
said first reception state further includes receiving on a first frequency;
said second reception state includes receiving on said first antenna on a second frequency;
said step of switching further comprises the step of switching from said first frequency to said second frequency;
said step of making at least one measurement further comprises the step of measuring a second received signal strength on said second frequency;
said step of determining further comprises the step of comparing said second received signal strength on said second frequency to a first received signal strength on said first frecquency; and
wherein said step of switching is scheduled to coincide with the occurrence of multiple subframes with invalid power control bits.

22. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
wherein:
said first reception state further includes receiving on a first frequency;
said second reception state includes receiving on said first antenna on a second frequency;
said step of switching further comprises the step of switching from said first frequency to said second frequency;
said step of making at least one measurement further comprises the step of measuring a second received signal strength on said second frequency;
said step of determining further comprises the step of comparing said second received signal strength on said second frequency to a first received signal strength on said first frequency; and
further comprising the step of responding to a command to lower a transmission rate irrespective of speech activity.

23. A method for establishing a preferred reception state in a continuous reception receiver, the method comprising the steps of:
receiving a signal on a first antenna according to a first reception state, said signal including at least one power control bit;
processing said signal with a receiver chain;
switching receiving from said first reception state to a second reception state;
making at least one measurement while receiving according to said second reception state;
determining whether said first reception state is superior to said second reception state;
establishing receiving according to a superior reception state based on said step of determining; and
wherein:
said first reception state further includes receiving on a first frequency;
said second reception state includes receiving on said first antenna on a second frequency;
said step of switching further comprises the step of switching from said first frequency t o said second frequency;
said step of making at least one measurement further comprises the step of measuring a second received signal strength on said second frequency;
said step of determining further comprises the step of comparing said second received signal strength on said second frequency to a first received signal strength on said first frequency; and
further comprising the step of issuing a command to lower a transmission rate irrespective of speech activity.

24. A method for establishing a preferred reception state in a continuous reception receiver, the method comprising the steps of:
receiving a signal on a first antenna according to a first reception state, said signal including at least one power control bit;

processing said signal with a receiver chain;

switching receiving from said first reception state to a second reception state;

making at least one measurement while receiving according to said second reception state;

determining whether said first reception state is superior to said second reception state;

establishing receiving according to a superior reception state based on said step of determining; and further comprising the step of lowering a transmission rate for measurement purposes by considering how multiple subframes with invalid power control bits will occur.

25. A method for implementing antenna pre-detection selection diversity in a continuous transmission wireless communications system, the method comprising the steps of:

receiving a signal on a first antenna, said signal including at least one power control bit;

processing said signal as received on said first antenna with a receiver chain;

storing a set of rake taps for said first antenna;

switching to a second antenna;

receiving said signal on said second antenna;

processing said signal as received on said second antenna with said receiver chain;

determining a second parameter of said signal on said second antenna;

comparing a first parameter of said signal on said first antenna with said second parameter of said signal on said second antenna;

selecting one of said first and second antennas for subsequent reception based on said step of comparing; and further comprising the step of:

if said first antenna is selected in said step of selecting, then restoring said set of rake taps and continuing reception with said first antenna and said set of rake taps.

26. The method of claim 25, wherein:

said first parameter of said signal on said first antenna is a first received signal strength of said first antenna and said second parameter of said signal on said second antenna is a second received signal strength of said second antenna; and said step of determining further comprises the step of measuring said second received signal strength.

27. The method of claim 26, further comprising, prior to said step of switching, the step of measuring said first received signal strength of said first antenna.

28. The method of claim 25, further comprising, prior to said step of switching, the step of determining a subframe with invalid power control bits; and wherein said step of switching is scheduled to occur during said subframe with invalid power control bits.

29. The method of claim 25, wherein said step of switching is scheduled to occur after reception of power control bits in a subframe.

30. A method for making measurements for the purpose of inter-frequency mobile assisted handoff in a continuous reception wireless communications system, the method comprising the steps of:

receiving a signal at a first frequency, said signal including at least one power control bit;

processing said signal as received at said first frequency with a receiver chain;

receiving a command from a base station to lower a transmission rate;

lowering said transmission rate responsive to reception of said command;

switching reception from said first frequency to a second frequency;

making a second received signal strength measurement at said second frequency;

switching reception from said second frequency to said first frequency;

transmitting a report to said base station, said report including said second received signal strength measurement; and further comprising the step of:

raising said transmission rate after said step of switching reception from said second frequency to said first frequency.

31. The method of claim 30, further comprising, prior to said step of transmitting, the step of determining whether additional measurements are necessary in order for said base station to ascertain whether a command to perform an inter-frequency handoff is advantageous; and if so, repeating at least said steps of switching and making.

32. A method for sacrificing the reception of at least one lower priority bit class on a selected receive antenna in a continuous reception wireless communications system, the method comprising the steps of:

determining a first class of bits, said first class of bits having a first reception priority;

determining a second class of bits, said second class of bits having a second reception priority, said first reception priority being higher than said second reception priority;

determining a period in which no bits of said first class of bits are scheduled to be received; and inhibiting reception of at least a portion of said second class of bits on said selected receive antenna.

33. The method of claim 32, wherein said step of inhibiting reception of at least a portion of said second class of bits on said selected receive antenna further comprises the step of ceasing reception of said at least a portion of said second class of bits on said selected receive antenna during said period.

34. The method of claim 32, further comprising the steps of:

making at least one measurement during said period; and continuing reception prior to an arrival of said first class of bits after said step of making at least one measurement during said period.

35. The method of claim 32, wherein said step of determining a period in which no bits of said first class of bits are scheduled to be received further comprises the steps of:

determining whether a set of said first class of bits to be received during said period will be invalid; and if so, determining that no bits of said first class of bits are scheduled to be received during said period.

36. The method of claim 32, wherein said first class of bits comprises power control bits and said second class of bits comprises coded speech bits.

* * * * *

UNITED STATES PATENT AND TRADEMARK OFFICE
CERTIFICATE OF CORRECTION

PATENT NO. : 6,212,368 B1
DATED : April 3, 2001
INVENTOR(S) : Ramesh et al.

Page 1 of 1

It is certified that error appears in the above-identified patent and that said Letters Patent is hereby corrected as shown below:

Title page,
Item [74], replace "*Attorney, Agent, or Firm*-Uenkens & Gilchrist, P.C." with --
*Attorney, Agent, or Firm*-Jenkens & Gilchrist, P.C. --

Column 15,
Line 58, replace "frecquency" with -- frequency --

Column 16,
Line 51, replace "t o" with -- to --

Signed and Sealed this

Twenty-ninth Day of January, 2002

Attest:

Attesting Officer

JAMES E. ROGAN
*Director of the United States Patent and Trademark Office*